US012726343B1

(12) United States Patent
Ethington et al.

(10) Patent No.: US 12,726,343 B1
(45) Date of Patent: Sep. 1, 2026

(54) SYSTEMS AND METHODS FOR ADDING TRUSTED BLOCKS TO DISTRIBUTED LEDGERS

(71) Applicant: United Services Automobile Association (USAA), San Antonio, TX (US)

(72) Inventors: Benjamin D. Ethington, Sapulpa, OK (US); Soon Fatt Hoo, Tahlequah, OK (US)

(73) Assignee: United Services Automobile Association (USAA), San Antonio, TX (US)

( * ) Notice: Subject to any disclaimer, the term of this patent is extended or adjusted under 35 U.S.C. 154(b) by 16 days.

(21) Appl. No.: 18/783,255

(22) Filed: Jul. 24, 2024

(51) Int. Cl.
*H04L 9/08* (2006.01)
*H04L 9/00* (2022.01)
*H04L 67/1097* (2022.01)

(52) U.S. Cl.
CPC ............. *H04L 9/0861* (2013.01); *H04L 9/50* (2022.05); *H04L 67/1097* (2013.01)

(58) Field of Classification Search
CPC ...... H04L 9/0861; H04L 9/50; H04L 67/1097
See application file for complete search history.

(56) References Cited

U.S. PATENT DOCUMENTS

| | | | | |
|---|---|---|---|---|
| 2018/0083932 | A1* | 3/2018 | Adams | H04L 63/0435 |
| 2020/0139932 | A1* | 5/2020 | Wood | H04L 9/3247 |
| 2025/0252224 | A1* | 8/2025 | Huber | G01D 21/00 |
| 2025/0254038 | A1* | 8/2025 | Huber | H04L 9/0894 |

FOREIGN PATENT DOCUMENTS

| | | | | |
|---|---|---|---|---|
| WO | WO-2020039174 A1 * | 2/2020 | | G09F 3/0341 |

* cited by examiner

*Primary Examiner* — Jonathan A Bui
(74) *Attorney, Agent, or Firm* — Fletcher Yoder, P.C.

(57) ABSTRACT

A system may include a device that may communicate data associated with the device. The data may include an authentication key generated via a circuit configured to generate the authentication key based on a presence of a signal. The system may also include a sensor device that may output the signal to the device based on a determination of tampering of a housing of the device. The system may also include a server device that may receive a request to publish the data, verify the authentication key, and store the data in a storage component in response to verifying the authentication key.

20 Claims, 4 Drawing Sheets

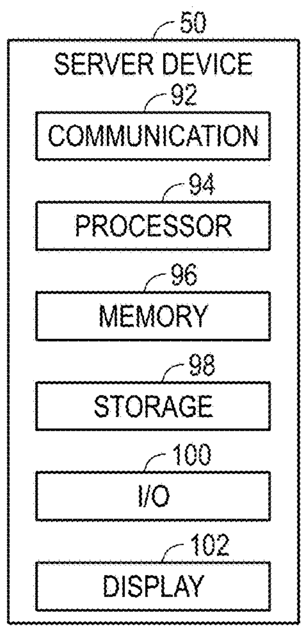
*FIG. 3*
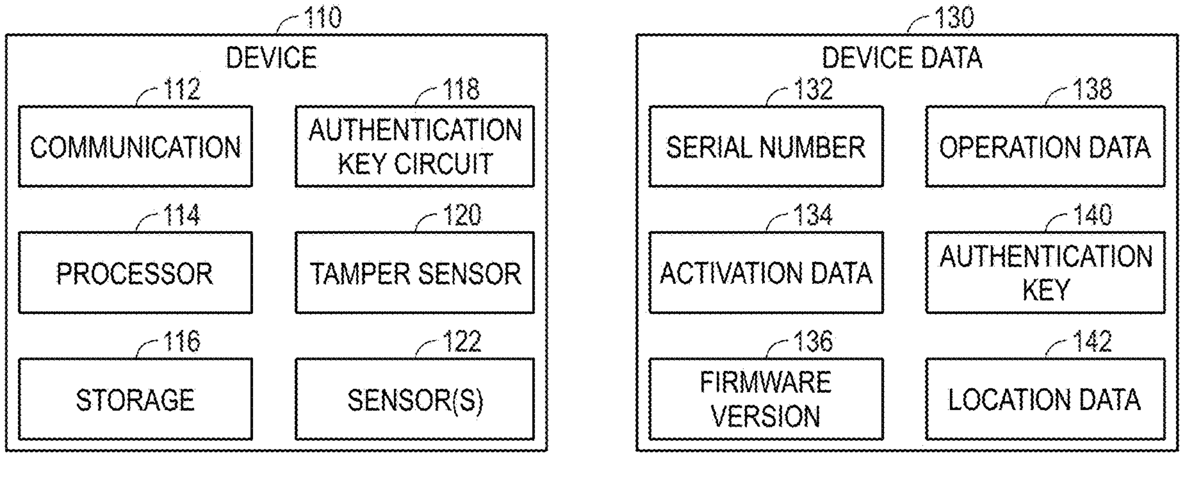
*FIG. 4*
*FIG. 5*

SYSTEMS AND METHODS FOR ADDING TRUSTED BLOCKS TO DISTRIBUTED LEDGERS

BACKGROUND

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

Internet-of-things (IoT) devices and other devices that are capable of communicating with a network continue to increase in use over time. As such, the ability to track and monitor the products that have been distributed on the market is greatly enhanced by the availability of data related to the operations and uses of these devices over time. The proliferation of data being output by these devices can, however, prove to be challenging to organize, sort, and secure. Indeed, it may be beneficial to provide improved systems to ensure authenticity of data being provided to the network.

BRIEF DESCRIPTION

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

In one embodiment, a system may include a device that may communicate data associated with the device. The data may include an authentication key generated via a circuit configured to generate the authentication key based on a presence of a signal. The system may also include a sensor device that may output the signal to the device based on a determination of tampering of a housing of the device. The system may also include a server device that may receive a request to publish the data, verify the authentication key, and store the data in a storage component in response to verifying the authentication key.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein:

FIG. 3 illustrates a block diagram of component of the service device of FIG. 1, in accordance with embodiments described herein;

FIG. 4 illustrates a block diagram of components of a device that may provide device data to the server device of FIG. 1, in accordance with embodiments described herein;

FIG. 5 illustrates a block diagram of components that may be provided in the device data, in accordance with embodiments described herein.

DETAILED DESCRIPTION

Figure 1:
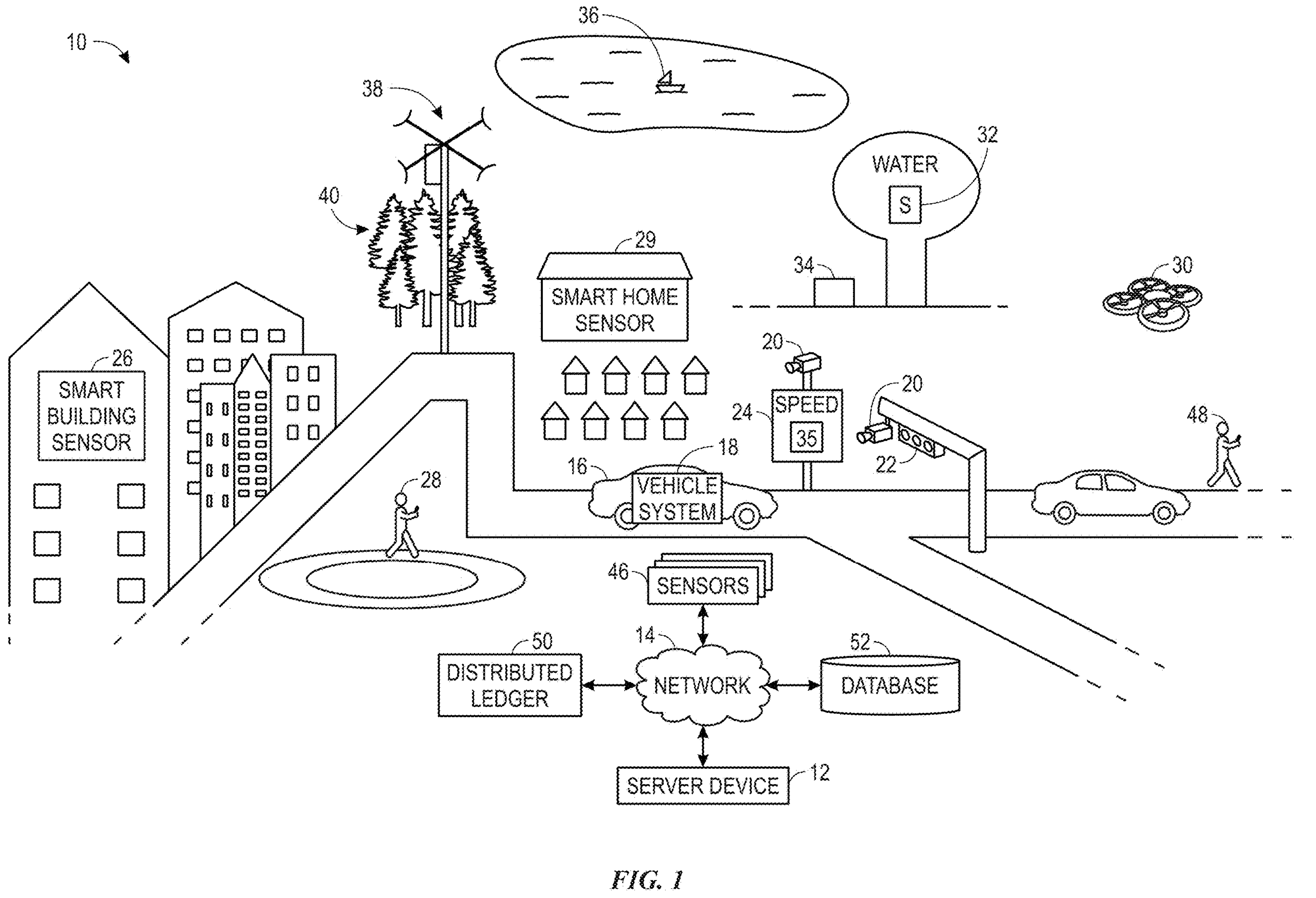
FIG. 1 is a diagram of a system including a variety of data sources that may be provided to a server device to collect data provided by the data sources, in accordance with embodiments described herein.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

In the following description, for the purposes of explanation, numerous specific details are set forth in order to provide a thorough understanding of embodiments of the present disclosure. It will be apparent, however, to one skilled in the art that embodiments of the present disclosure may be practiced without some of these specific details.

As used herein, terms "continuous" and "continuously" may refer to ongoing (e.g., iterative) actions that are performed without interruption or are performed with interruptions that take no longer than a relatively short period of time, such as no longer than a 5-second interruption between the ongoing actions, no longer than a 1-second interruption between the ongoing actions, and so forth. For example, continuous ongoing actions may be performed in an iterative manner such that there is no appreciable (e.g., human-perceivable) interruption of the iterative actions.

As used herein, the terms "automatic" and "automatically" may refer to actions that are performed by a computing device or computing system (e.g., of one or more computing devices) without human intervention. For example, automatically performed functions may be performed by computing devices or systems based solely on data stored on and/or received by the computing devices or systems despite the fact that no human users have prompted the computing devices or systems to perform such functions. As but one non-limiting example, the computing devices or systems may make decisions and/or initiate other functions based solely on the decisions made by the computing devices or systems, regardless of any other inputs relating to the decisions.

As used herein, the terms "real time" and "substantially real time" may refer to actions that are performed substantially simultaneously with other actions, without any human-perceptible delay between the actions. For example, two functions performed in substantially real time occur within seconds (or even within milliseconds) of each other. As but one non-limiting example, two functions performed in substantially real time occur within 1 second, within 0.1 second, within 0.01 second, and so forth, of each other.

As used herein, the term "application" may refer to one or more computing modules, programs, processes, workloads, threads, and/or computing instructions executed by a computing system. Example embodiments of an application include software modules, software objects, software instances, and/or other types of executable code.

The embodiments described herein include systems and methods for ensuring that authentic and accurate information is being provided received and stored on a distributed ledger (e.g., block chain). That is, as devices (e.g., IoT devices) increasingly communicate via a network, untrustworthy actors may attempt to send data packets via the network to corrupt datasets, gain illegitimate access to datasets or structures, and the like. Indeed, some of these actors may structure data packets to resemble datasets provided by known devices to corrupt the collected datasets. For instance, networked devices may send status update that may be stored in a database at regular intervals to provide a respective manufacturer of the device information regarding the use of the device. In some instances, corrupt or pseudo datasets may be sent to the network to appear as though they originate from the known device to corrupt the stored datasets. The corrupted datasets may cause the manufacturer to incorrectly diagnose devices as problematic, provide access of the stored data to the untrustworthy actor, damage the storage component, and the like.

With the forgoing in mind, a trusted device (e.g., trusted IoT device) may be manufactured, such that it may retain an authentication key to illustrates that it is a certified device and meets certain standards that allow it access to a storage component (e.g., database, distributed ledger). In some embodiments, the authentication key may allow the device to publish its data directly to a distributed ledger (e.g., block chain). As such, datasets communicated via the network without the authentication key may not be published or stored in the respective storage component, thereby avoid non-compliant device publication. In some embodiments, the authentication key for trusted devices may be embedded or integrated into the hardware of the device. That is, a circuit enclosed within a housing of the device may be made tamper resistant, such that after the circuit is exposed to light (e.g., detectable with ultra-violet (UV) light detectors, light sensors), the output of the authentication key provided by the circuit is disabled. The server device or data management system receiving the device data may store or publish the device data if the authentication key is received with the device data. As such, In addition, the present embodiments described herein may prevent malignant addition of the device data to the distributed ledger based on authenticated party voting by other nodes on the network of the distributed ledger. In some embodiments, the voting entities may evaluate the device data to determine whether a threshold amount of the device data matches expected datasets for the respective device. Each voting entity may have its own threshold for verifying authenticity, and an overall threshold approval voting percentage may be met before allowing the device data to be published on the distributed ledger.

By performing the embodiments described herein, corrupt, nefarious, or altered datasets may be prevented from being stored or logged onto the distributed ledger. As a result, the integrity of the stored datasets may be improved or ensured to allow data consumer to accurately update or perform related operations efficiently. Additional details with regard to ensuring that authentic device datasets are stored in storage components will be discussed below.

By way of introduction, FIG. 1 illustrates a diagram of a system (e.g., a smart city) 10 that includes a variety of data sources to that may be communicated to a server device 12, according to an embodiment of the present disclosure. Referring to FIG. 1, the system 10 may include a network 14 that may receive relevant data from the variety of data sources and transmit the data received from the data sources to the server device 12. As will be discussed in greater detail below, the server device 12 may receive datasets from the various data sources and store or publish the datasets after authenticating the datasets. Moreover, the server device 12 may coordinate or automate certain actions or commands in view of analysis performed on the stored data. That is, in some embodiments, the server device 12 may generate a coordinated set of instructions to various devices (e.g., sprinklers, drones, dams) to modify operations in conjunction with each other to assist individuals in view of the event.

The network 14 may receive data regarding operations, location, and other properties related to vehicles 16 via vehicle systems 18. For example, the vehicle system 18 may include speed data or location data, which the quantum computing prediction system 12 may use to collect various types of data (e.g., temperature, occupancy, traffic) in the area at a given moment. In certain embodiments, the vehicle 16 may include a video system (e.g., image and audio sensors that collect image and audio data), which may capture real-time area data (e.g., vehicle traffic in the area, pedestrian traffic in the area, weather conditions) at a street level and send the captured data to the quantum computing prediction system 12. In some embodiments, the video system may include an image sensor or any suitable a camera to capture real-time image data.

The system 10 may also include the cameras 20 that may be affixed to a traffic light 22 or a speed detector 24. The traffic light 22 (or traffic sign, or dedicated data collection device like a traffic collection tower) and the speed detector 24 may send collected data to the quantum computing prediction system 12 via the network 14 or any other suitable communication protocol. For example, the traffic light 22 may send data regarding the number of vehicles 16 passing the traffic light 22. The traffic light 22 may also receive commands (e.g., from the quantum computing prediction system 12) causing the traffic light 22 to turn red, yellow, green, flash yellow, flash red, and so on.

The speed detector 24 may send data to the quantum computing prediction system 12 regarding the posted speed limit in the area, and the speed detector 24 may receive commands (e.g., from the quantum computing prediction system 12) causing the speed detector 24 to dynamically change the posted speed limit of the area (e.g., to slow the traffic in the area to facilitate an emergency response). While traffic lights are discussed, it should be noted that any controllable assets (e.g., electronic buoys, or other markers or indicators that may be disposed within or alongside a waterway, air traffic control lights, and so on) may be employed in the embodiments described herein.

The server device 12 may collect, via the network 14, data from building sensors 26. The building sensors 26 may be coupled to structures (e.g., buildings, bridges, roads, and so on). The building sensors 26 may include a vibration sensor, a seismometer, a seismograph (e.g., to detect and record seismic events, volcanic activity, explosions, collisions, falling objects, etc.), water level sensors, humidity sensors, heat sensors, infrared sensors, or any other appropriate sensor that may provide information related to the ambient environment within or outside a building. For example, a water sensor may be used to determine flooding on a street including depth and force/speed, while heat sensors and/or infrared sensors may assist in locating a fire, determining where the fire may have originated, determining in which direction the fire is traveling, and so on.

The server device 12 may also collect data from and/or about individuals in the area. For example, the individuals may be wearing wearable devices 28 that may include medical, biometric and/or location tracking devices. The server device 12 may track the location and health of the individuals via the wearable devices 28, which may provide information related to the presence of individuals in various locations.

Additionally, the server device 12 may receive data from smart home sensors 29. The smart home sensors 29 may include devices that may be positioned in a home or building and may be connected to a network. The smart home sensors 29 may include contact sensors that detect a position of door or other physical component, motion sensors that track movement of objects, vibration sensors, sound sensors that detect noise, water sensors that detect the presence of water or liquid in a location, temperature/humidity sensors, light (e.g., ultraviolet, infrared) sensors, smoke/carbon dioxide/gas sensors, electricity usage sensors, and the like. The smart home sensors 29 may also include devices that perform certain home automation operations. The devices may include smart plug-in devices that control the flow of electricity to connected devices, smart doorbells that track movement outside of the home and doorbell usages, security cameras that record objects present in its view under various conditions, smart thermostats that may control the heating and air conditioning systems, smart appliances (e.g., refrigerator, vacuum cleaner) that perform specific operations, smart assistant devices that respond to audio commands, listen to ambient noises that may be present, and control operations of connected devices, smart light fixtures, smart plumbing devices, and the like.

In addition to the devices described above, in some embodiments, drones 30 (e.g., unmanned aerial vehicles) may be employed to collect traffic data, image data, and the like. The drones 30 may be ground-based drones that traverse roads and different terrains via the air or surface to collect various types of data. In some situations, the drones may be waterborne. Other drones might traverse fluid pipes, gas pipes, drainage pipes, chimneys, caves, service tunnels, crawl spaces, attics, basements, parking garages, subways, etc. In this way, the drones may be positioned in the area and provide data to the server device 12 or other suitable device to perform the embodiments described herein.

The system 10 may also include a water tower sensor 32 that may detect water level in a water tower that provides clean water to residents of a city or area. The water tower sensor 32 be communicatively coupled to a water pump 34 that may pump water to various destination ports or from the water tower.

A smart buoy 36 may provide information related to a body of water, such as reservoir, river, lake, drainage area, or the like. The smart buoy 36 may detect a water level, wind speed, water temperature, water acidity level, and other properties related to a body of water.

In some embodiments, a wind sensor 38 may detect a wind speed, air quality properties (e.g., carbon monoxide, acid gases, smoke properties), and the like. One or more wind sensors 38 may be positioned at various locations within the system 10. In some cases, the wind sensor 38 may be positioned in a forest area 40 or other wooded area to track wind patterns.

Additional data may be acquired by smart mobile devices 48 owned and carried by individuals. The smart mobile devices 48 may include any suitable device that may communicate data with the network 14. As such, the smart mobile device 48 may include smart phones, smart watches, network-enabled tablet devices, and the like. The smart mobile devices 48 may include location services that track a location of the respective device.

As mentioned above, the server device 12 may be communicatively coupled to the sensors and devices described above via the network 14 or some suitable communication protocol. In addition to the data sources mentioned above, the server device 12 may collect data from a wide variety of sensors 46. The sensors 46 may include any type of device capable of detecting location, moisture, temperature, light, and the like. One or more sensors 46 may be disposed on different types of property such as an individual, a home, a vehicle, and the like. In certain embodiments, one or more sensors 46 may be disposed within certain rooms of the home, outside the home, within the vehicle, or outside the vehicle. The sensors 46 may also be disposed on devices carried by or worn by individuals. For example, the sensors 46 may be disposed on mobile phones, wearable electronics, and the like. In one embodiment, the sensors 46 may provide location information regarding the sensors 46. As such, the sensors 46 may provide global positioning system (GPS) coordinates and the like to indicate a location of the sensors 46.

With the foregoing in mind, the server device 12 may collect or receive data from the various devices described above and authenticate the data based on an authentication key provided with the data. In some embodiments, each device may include a hardware component that outputs an authentication key that may include number, alpha-numeric characters, or other characters. The authentication key may be pre-programmed to be output by an electronic device within the corresponding data providing device. That is, for example, a circuit or processor may be pre-programmed to output a certain authentication key when powered on. The server device 12 may have access to valid authentication keys for various devices within its internal storage component or external storage components (e.g., database). In any case, the server device 12 may receive the authentication key, which may be provided separately from the communicated dataset or within the communicated dataset, and determine whether the authentication key is valid based on the stored authentication key for the respective device.

The stored authentication keys may be organized in a data structure that indexes identification parameters of the respective device such as a serial number, a manufacture date, a firmware version, a model number, a product identification, and the like. As such, the device data provided to the server device 12 may include some identification information, as well as the authentication key, such that the server device 12 may authenticate the received device data by querying the stored authentication key for the respective device.

After authenticating the device data, the server device 12 may store the device data in distributed ledger 50, database 52, or both. The distributed ledger 20 may include one or more blockchains and may be hosted on any suitable number of computing devices that operate as nodes for the distributed ledger 102, as described in greater detail herein. Such nodes may be geographically distributed in any suitable number of locations.

The distributed ledger 50 may store datasets in a digital system for storing datasets in a decentralized manner. As such, the distributed ledger 40 is a consensus of shared and synchronized digital data that is distributed across many computing nodes. The distributed ledger 50 may incorporate a per-to-peer computer network and consensus algorithms to reliability distribute the ledger across distributed computer nodes.

In certain embodiments, multiples server devices may be nodes that host at least a portion of the distributed ledger 50. Alternatively, the distributed ledger 50 may be hosted on computing device(s) other than the server device(s) 50. The server device(s) 50 may include any suitable number and type of computing devices. In certain embodiments, the distributed ledger 50 (e.g., blockchain system) may provide for information management that is relatively fast, inexpensive, ubiquitous, secure, and immutable. In certain embodiments, the distributed ledger 50 may include a main blockchain and one or more sidechains that are linked to the main blockchain.

Figure 2:
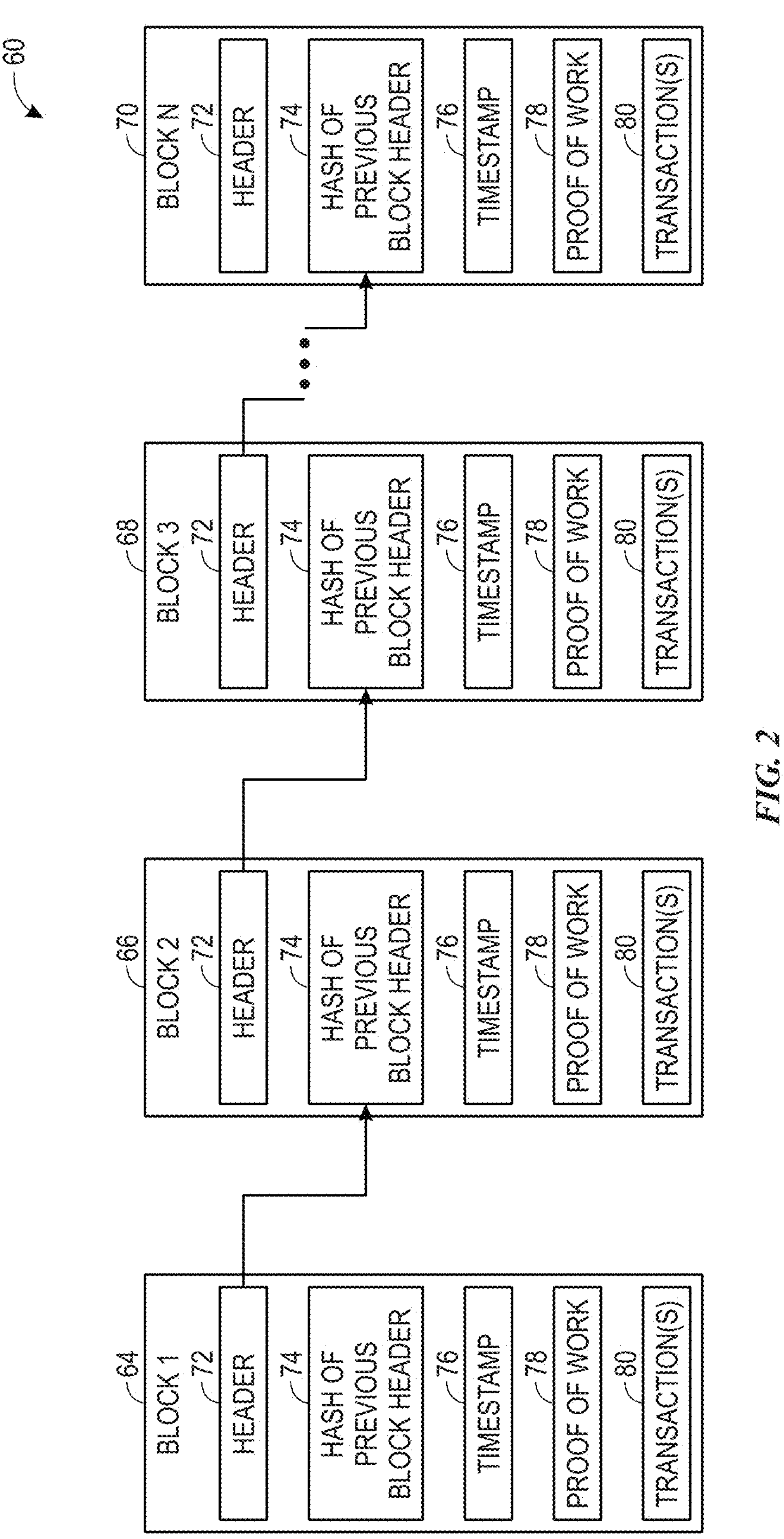
FIG. 2 illustrates a block diagram of a blockchain of the system of FIG. 1, in accordance with embodiments described herein.

FIG. 2 illustrates a block diagram of a blockchain 60 that may correspond to a series of device datasets provided to the server device 12 of FIG. 1, in accordance with embodiments described herein. In the illustrated embodiment, the blockchain 60 is illustrated as having multiple blocks 64, 66, 68, and 70. The block 64 (first block in the blockchain 120) may have been created, for example, by the server device(s) 50, and allocated as a special starting block. The block 64 may include a unique header 72 uniquely identifying the block 64 from other blocks in the blockchain 60. Because the block 64 is the first block in the blockchain 60, a hash of a previous block header 74 may be set to zero. A timestamp 76 may include the date of creation for the block 64, and a proof of work section 78 may include certain "work" that proves that a "miner" has performed work suitable for the creation of the block 64 and/or to verify transactions 80 in the blockchain 60. The work section 78 may vary based on a protocol used to create the blockchain 60. The transaction 80 may include payload data or information related to the data intended to be stored, such as the device data mentioned above.

When a new block is created, the block will receive a new header 72 uniquely identifying the new block. As described in greater detail herein, a peer-to-peer network may include multiple "miners" that add blocks to the blockchain 60 based on the blockchain protocol. In general, multiple miners validate transactions 80 that are to be added to a block, and compete (e.g., perform computing work, as introduced above) to have their respective block added to the blockchain 60. Validation of transactions includes verifying digital signatures associated with respective transactions 80. For a block to be added to the blockchain 60, a miner must demonstrate a proof of work before their proposed block of transactions is accepted by the peer-to-peer network, and before the block is added to the blockchain 60. In certain embodiments, a blockchain protocol include a proof of work scheme (e.g., Merkle Tree) that is based on a cryptographic hash function (CHF).

Referring now to FIG. 3, the server device 12 may include various types of components that may assist the computing system 10 in performing various types of computer tasks and operations. For example, the computing system 10 may include a communication component 92, a processor 94, a memory 96, a storage 98, input/output (I/O) ports 100, a display 102, and the like.

The communication component 92 may be a wireless or wired communication component that may facilitate communication between the server device 12 and various other computing systems and devices via a network, the Internet, or the like. For example, the communication component 92 may allow the server device 12 to obtain the data from the variety of data sources, including the data sources described above and others, such as database data (e.g., insurance database, sensor data database), cloud storage data, computer systems (e.g., smart phones, laptops, security devices), or any suitable storage component. The server device 50 may receive and send notifications to the smart devices. The communication component 92 may use a variety of communication protocols, such as Open Database Connectivity (ODBC), TCP/IP Protocol, Distributed Relational Database Architecture (DRDA) protocol, Database Change Protocol (DCP), HTTP protocol, other suitable current or future protocols, or combinations thereof.

The processor 94 may process instructions for execution within the server device 12. The processor 94 may include single-threaded processor(s), multi-threaded processor(s), or both. The processor 94 may process instructions stored in the memory 96. The processor 94 may also include hardware-based processor(s) each including one or more cores. The processor 94 may include general purpose processor(s), special purpose processor(s), or both. The processor 94 may be communicatively coupled to other internal components (such as the communication component 92, the storage 98, the I/O ports 100, and the display 102).

The memory 96 and the storage 98 may be any suitable articles of manufacture that can serve as media to store processor-executable code, data, or the like. These articles of manufacture may represent computer-readable media (e.g., any suitable form of memory or storage) that may store the processor-executable code used by the processor 94 to perform the presently disclosed techniques. As used herein, applications may include any suitable computer software or program that may be installed onto the server device 12 and executed by the processor 94. The memory 96 and the storage 98 may represent non-transitory computer-readable media (e.g., any suitable form of memory or storage) that may store the processor-executable code used by the processor 94 to perform various techniques described herein. It should be noted that non-transitory merely indicates that the media is tangible and not a signal.

The I/O ports 100 may be interfaces that may couple to other peripheral components such as input devices (e.g., keyboard, mouse), sensors, input/output (I/O) modules, and the like. The display 102 may operate as a human machine interface (HMI) to depict visualizations associated with software or executable code being processed by the processor 14. In one embodiment, the display 102 may be a touch display capable of receiving inputs from an operator of the computing system 10. The display 22 may be any suitable type of display, such as a liquid crystal display (LCD), plasma display, or an organic light emitting diode (OLED) display, for example. Additionally, in one embodiment, the display 102 may be provided in conjunction with a touch-sensitive mechanism (e.g., a touch screen) that may function as part of a control interface for the server device 50.

It should be noted that the components described above with regard to the server device 50 are examples. Indeed, the server device 50 may include additional or fewer components relative to the illustrated embodiment.

With the foregoing in mind, FIG. 4 illustrates an example device 110 that may include any of the suitable devices described above with respect to FIG. 1 and can communicate data via the network 14. Although the following description of FIG. 4 details certain components that may be a part of the device 110, it should be understood that additional or fewer components may make up the device 110.

Referring now to FIG. 4, the device 110 may include a communication component 112, a processor 114, and a storage component 116, which may correspond to the descriptions above for the communication component 92, the processor 94, and the storage component 98 described above. In addition, the device 110 may include an authentication key circuit 118, a tamper sensor 120, and one or more sensors 122 for measuring various properties as described above with reference to sensors 46.

The authentication key circuit 118 may include an electronic circuit or logic circuit that outputs some alphanumeric characters, numerical characters, alphabet characters, or other suitable character output that may serve as an authentication key. In some embodiments, the authentication key circuit 118 may be programmed at the time of manufacturing to output a particular key. In some embodiments, the authentication key circuit 118 may perform an algorithm using known data (e.g., serial number of device) and other acquired data (e.g., location data). In any case, the server device 50 may have access to the expected authentication key, the employed algorithms, or other information that may assist the server device 50 to generate the authentication key for verifying that the provided authentication key is authentic.

In some embodiments, the authentication key circuit 118 may include a Physically Unclonable Function (PUF) device that may include a hardware security component that exploits the inherent variations in manufacturing processes to create a unique identifier for each device. That is, the PUF device may account for variations or differences that naturally occur during the fabrication or manufacturing of the device 110. For example, the PUF device may generate a unique digital fingerprint for each chip that makes up the authentication key circuit 118, the processor 114, or the like. Since the fingerprint is derived from physical characteristics that are extremely difficult to replicate, PUF-based security mechanisms are highly resistant to cloning and tampering.

In addition to the authentication key circuit 118, the device 110 may include a tamper sensor 120 that may detect a physical disturbance in the integrity of the components housed in the device 110. For example, the tamper sensor 120 may include a light sensor (e.g., ultraviolet light) that detects the presence of light. When the housing of the device 110 is sealed, the light within the housing of the device 110 may be minimal or below some luminance threshold. However, if the housing is compromised, broken, or opened, light may become visible and the luminance may be above the luminance threshold. Accordingly, the tamper sensor 120 may output a signal indicative of the suspected tampering event.

Although the tamper sensor 120 is described as being a light sensor, it should be noted that other technologies and/or equipment may be used for the tamper sensor 120. For example, a vibration sensor may be used to determine if the housing of the device 110 is being penetrated, broken, or the like. In addition, a mechanical latch or relay may be coupled to adjacent connecting portions of the housing, such that the tamper sensor 120 may output the signal after detecting that the mechanical latch is no longer connected to each other due to the housing being opened. In addition, the tamper sensor 120 may include a circuit component (e.g., close circuit, resistor, fuse) that changes electrical state (e.g., resistance, capacitance, voltage) when the housing is opened and the circuit component is altered.

In some embodiments, the signal output by the tamper sensor 120 may be provided to the authentication key circuit 118. In turn, the authentication key circuit 118 may refrain from or stop outputting the authentication key. Indeed, the authentication key circuit 118 may operate such that the authentication key is generated or made available in the absence of the output signal being provided by the tamper sensor 120. However, it should be noted that the tamper sensor 120 may be designed to output a safe signal when tamper detector is not detecting a tamper event, such that the authentication key circuit 118 may generate the authentication key when the safe signal is present.

FIG. 5 illustrates an example device data 130 provided by the device 110 as described above with reference to FIGS. 1 and 4. Although the device data 130 is described as include certain types of data, it should be understood that the device data 130 may include additional or fewer datasets.

By way of example, the device data 130 may include serial number data 132 that may identify the respective device 110. The device data 130 may also include activation data 134, which may provide information related to the date and time that the device 110 was activated or initially powered. The firmware version 136 may provide information related to a firmware version that the software being executed by the processor 114 or circuit devices of the device 110.

In addition, operation data 138 may record information related to the operational characteristics of the device 110. That is, the operational data 138 may include an amount of power consumed, a number of data packets communicated, various operations or functions performed by the device 110, and the like. The authentication key 140 may include the key provided by the authentication key circuit 118. The location data 142 may include information related to the current or detected location of the device 110, as detected by a location sensor, Wi-Fi signals, or other location tracking technology.

In some embodiments, the server device 50 may receive the device data 130 and use the authentication key 140 to determine whether the device data 130 is authentic. That is, the server device 50 may receive the authentication key 140 and query a database or other storage component to verify the authenticity of the authentication key 140. If the authentication key 140 is not verified or is not included with the device data 130, the server device 50 may flag the received device data 130, disregard the received device data 130, send a notification indicative of the potentially tampered device to a user device or other computing system, or the like. In some embodiments, the notification may cause the receiving device to automatically execute an application, present a visualization, or generate a haptic or audible alert to notify a user of the tampering event. In this way, the server device 50 may protect the authenticity of the collected datasets.

In addition to using the authentication key 140 to verify the authenticity of the device data 130, the server device 50 may solicit votes from other devices that may have access to information collected from the respective device 110 over time to confirm that the device data 130 is authentic. That is, if the received data includes a threshold amount of datasets that match the expected datasets for the device data 130 as previously detected by the other devices, the server device 12 may authenticate the data without the authentication key 140.

Figure 6:
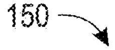
FIG. 6 illustrates a flow chart of a method for publishing device data on a distributed ledger, in accordance with embodiments described herein.
Figure 6:
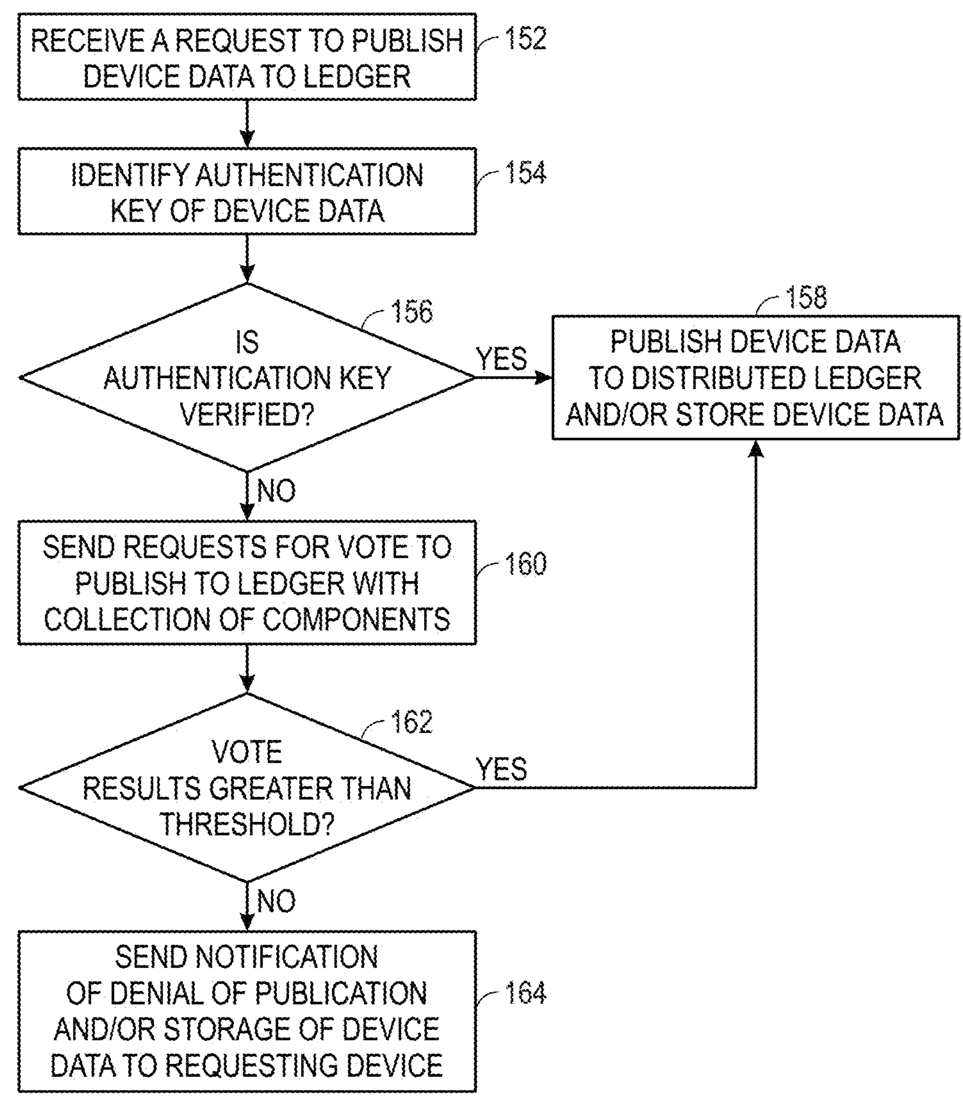

Keeping the foregoing in mind, FIG. 6 illustrates a flowchart of a method 150 for publishing received data to the distributed ledger 50, storing the received data in the database 52, and the like. Although the following description of the method 150 is detailed as being performed by the server device 12, it should be noted that any suitable computing device may perform the method 150 in any suitable order.

Referring now to FIG. 6, at block 152, the server device 12 may receive a request to publish the device data 130 directly to the distributed ledger 50 or store the device data 130 on the database 52. The request may be communicated from the device 110, itself, or via a user device that routes the device data 130 to the server device 50. In some embodiments, the device 110 may periodically send updates to the server device 50 for warranty services, tracking data, or other suitable purposes. As such, the request may be sent with the device data 130 that is to be published, stored, or both.

At block 154, the server device 12 may identify the authentication key 140 within the device data 130. That is, the server device 12 may parse the data packets received as part of the device data 130 and retrieve the authentication key 140 from the received device data 130.

At block 156, the server device 12 may determine whether the authentication key 140 is verified. That is, the server device 12 may query the database 52 or other suitable storage component to determine an expected authentication key for the respective device 110. As such, in some embodiments, the server device 12 may determine whether the pre-programmed authentication key 140 matches the expected authentication key stored for the respective device 110. The database 52 may include organized datasets that are indexed according to device type, device identification information, or the like. The datasets may also include algorithms or functions that the server device 50 may implement to generate the expected authentication key, as discussed above.

If the authentication key is verified, the server device 12 may proceed to block 158 and publish the device data to the distributed ledger 50. That is, the server device 50 may have direct access to the distributed ledger 50 to publish the additional device data 130 received at block 152. If, however, at block 156, the server device 50 does not verify the authentication key 140, the server device 50 may proceed to block 160.

At block 160, the server device 12 may send requests for votes on whether to publish or store the received device data 130 to other devices that may be nodes that are part of the distributed ledger 50. In other embodiments, the other devices may include devices that have received previous instances or updates of the device data 130 over time. In either case, the other devices may compare the received device data 130 with respect to previous versions of the device data 130. Indeed, some portions of the device data 130 may be expected to remain consistent or the same, such as the serial number 132, the location data 142, and the like. In addition, some portions of the device data 130 may be expected to change according to some machine learning model or inference. For instance, the operation data 136 may be expected to indicate certain inefficiencies with respect to power consumption or operations over time given the expected use of the device 110.

Each device that receives the request for vote may have a device data threshold that it expects the device data 130 to match the expected device data to approve or verify the device data 130. At block 162, the server device 50 may receive the votes from the other devices and determine whether the received votes exceed or equal a vote threshold (e.g., 70% of requested votes) for verifying the device data 130. If the server device 12 determines that the received votes exceed the vote threshold, the server device may proceed to block 158. If, however, the server device 12 determines that the votes do not exceed the vote threshold, the server device may proceed to block 164 and send a notification to a user device, the other devices, the device 110, or other device to indicate the denial of publication of the device data 130 to the distributed ledger 50, the denial of storage of the device data, and the like.

While only certain features of the disclosure have been illustrated and described herein, many modifications and changes will occur to those skilled in the art. It is, therefore, to be understood that the appended claims are intended to cover all such modifications and changes as fall within the true spirit of the present disclosure.

What is claimed:

1. A system, comprising:

a device comprising processing circuitry configured to communicate data associated with the device, wherein the data comprises an authentication key generated via a circuit configured to generate the authentication key based on a presence of a signal;

a sensor device configured to output the signal to the device based on a determination of tampering of a housing of the device; and a server device configured to:

receive a request to publish the data;

verify the authentication key; and store the data in a storage component in response to verifying the authentication key.

2. The system of claim 1, wherein the storage component comprises a distributed ledger.

3. The system of claim 2, wherein the distributed ledger comprises a blockchain.

4. The system of claim 1, wherein the sensor device is configured to determine the tampering of the housing of the device based on one or more sensors configured to detect light, vibration, mechanical movement, or any combination thereof.

5. The system of claim 1, wherein the server device is configured to:

send one or more requests for one or more votes associated with authenticating the data; and verify the data based on the one or more votes exceeding a threshold.

6. The system of claim 5, wherein the server device is configured to:

send a notification indicative of a denial of storing the data in response to the one or more votes not exceeding the threshold.

7. The system of claim 1, wherein the server device is configured to:

receive an additional request to publish additional data associated with an additional device, wherein the additional data comprises an additional authentication key;

determine that the additional authentication key is unverified; and send a notification indicative of a denial of storing the additional data in response to the additional authentication key being unverified.

8. A method, comprising:

receiving, via a server device, a request to publish data received from a device, wherein the data comprises an authentication key generated via a circuit configured to generate the authentication key based on a presence of a signal output by a sensor device, wherein the sensor device is configured to output the signal to the device based on a determination of tampering of a housing of the device;

verifying, via the server device, the authentication key; and storing, via the server device, the data in a storage component in response to verifying the authentication key.

9. The method of claim 8, wherein the storage component comprises a distributed ledger.

10. The method of claim 9, wherein the distributed ledger comprises a blockchain.

11. The method of claim 8, wherein the sensor device is configured to determine the tampering of the housing of the device based on one or more sensors configured to detect light, vibration, mechanical movement, or any combination thereof.

12. The method of claim 8, comprising:

sending one or more requests for one or more votes associated with authenticating the data; and verifying the data based on the one or more votes exceeding a threshold.

13. The method of claim 12, comprising:

sending a notification indicative of a denial of storing the data in response to the one or more votes not exceeding the threshold.

14. The method of claim 8, comprising:

receiving, via the server device, an additional request to publish additional data received from an additional device, wherein the additional data comprises an additional authentication key;

determining, via the server device, that the additional authentication key is unverified; and sending, via the server device, a notification indicative of a denial of storing the additional data in response to the additional authentication key being unverified.

15. A non-transitory computer-readable medium comprising computer-executable instructions that, when executed, are configured to cause one or more processors to perform operations comprising:

receiving, via communication circuitry, a request to publish data received from a device, wherein the data comprises an authentication key generated via a circuit configured to generate the authentication key based on a presence of a signal output by a sensor device, wherein the sensor device is configured to output the signal to the device based on a determination of tampering of a housing of the device;

querying a storage component comprising an indication of an expected authentication key;

verifying the authentication key by comparing the authentication key and the expected authentication key; and storing the data in the storage component in response to verifying the authentication key.

16. The non-transitory computer-readable medium of claim 15, wherein the storage component comprises a distributed ledger.

17. The non-transitory computer-readable medium of claim 16, wherein the distributed ledger comprises a blockchain.

18. The non-transitory computer-readable medium of claim 15, wherein the sensor device is configured to determine the tampering of the housing of the device based on one or more sensors configured to detect light, vibration, mechanical movement, or any combination thereof.

19. The non-transitory computer-readable medium of claim 15, wherein the instructions further cause the one or more processors to perform the operations comprising:

sending one or more requests for one or more votes associated with authenticating the data; and verifying the data based on the one or more votes exceeding a threshold.

20. The non-transitory computer-readable medium of claim 19, wherein the instructions further cause the one or more processors to perform the operations comprising:

sending a notification indicative of a denial of storing the data in response to the one or more votes not exceeding the threshold.

* * * * *